(12) United States Patent
Cai et al.

(10) Patent No.: US 12,121,488 B1
(45) Date of Patent: Oct. 22, 2024

(54) MASSAGE DEVICE BASED ON NOVEL LINEAR MOTOR

(71) Applicant: Shenzhen Enke Electric Technology Co., Ltd., Shenzhen (CN)

(72) Inventors: Xinbo Cai, Shenzhen (CN); Yibiao Deng, Shenzhen (CN); Shu Deng, Shenzhen (CN)

(73) Assignee: Shenzhen Enke Electric Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/641,267

(22) Filed: Apr. 19, 2024

(30) Foreign Application Priority Data

Mar. 16, 2024 (CN) .......................... 202410306538.9

(51) Int. Cl.
*A61H 23/00* (2006.01)
*A61H 7/00* (2006.01)
*A61H 23/02* (2006.01)

(52) U.S. Cl.
CPC .......... *A61H 23/006* (2013.01); *A61H 7/008* (2013.01); *A61H 23/02* (2013.01); *A61H 2201/123* (2013.01)

(58) Field of Classification Search
CPC ........ A61H 23/006; A61H 23/02; A61H 7/00; A61H 2201/123; A61H 19/00; A61H 19/50; A61H 7/008; A61H 7/004; A61H 2201/1664; A61H 2201/1665; H02K 33/00; H02K 1/08; H02K 1/14; H02K 1/18; H02K 1/34; H02K 3/531; H02K 3/521; H02K 7/003; H02K 7/145; H02K 15/022; H02K 15/03
See application file for complete search history.

(56) References Cited

U.S. PATENT DOCUMENTS

2023/0172793 A1* 6/2023 Witt ...................... A61H 9/0057
600/38

FOREIGN PATENT DOCUMENTS

| CN | 209900021 U | 1/2020 |
|---|---|---|
| CN | 211272226 U | 8/2020 |
| CN | 213553517 U | 6/2021 |

* cited by examiner

*Primary Examiner* — Michael R Reid
*Assistant Examiner* — Sarah B Lederer
(74) *Attorney, Agent, or Firm* — Nitin Kaushik

(57) ABSTRACT

The present invention discloses a massage device based on a novel linear motor, including a motor end cover, a motor assembly, and a massage assembly, wherein the motor end cover consists of a first end cover and a second end cover, the motor assembly is located between the end covers and includes a magnetic guide core, a holding through cavity is formed in a core of the magnetic guide core, clamping slots are formed in two side walls of the holding through cavity, winding cores are mounted in the clamping slots, winding frames are mounted on the winding cores, a mover bracket is disposed in the holding through cavity, a strong magnet is clamped in the mover bracket with an axial end on which a transmission push rod is disposed, and the massage assembly is connected to the transmission end of the motor assembly.

10 Claims, 19 Drawing Sheets

MASSAGE DEVICE BASED ON NOVEL LINEAR MOTOR

CROSS-REFERENCE TO RELATED APPLICATIONS

The application claims priority to Chinese patent application No. 2024103065389, filed on Mar. 16, 2024, the entire contents of which are incorporated herein by reference.

TECHNICAL FIELD

The present invention relates to the technical field of massage apparatuses, particularly to a massage device based on a novel linear motor.

BACKGROUND

In today's fast-paced life, people's attention to health and quality of life is increasing. With this trend, massage technology has received significant attention, leading to the emergence of massage devices. These massage devices are designed to provide personalized and targeted massage experience to meet diverse needs of individuals. They integrate advanced technology and ergonomic design to offer the optimal comfort level and effects during use. By equipping intelligent control systems, users can adjust the massage intensity, mode, and parts according to personal preferences and physical conditions to achieve the most suitable massage experience. At the same time, the massage devices employ various techniques such as kneading, vibrating, and tapping to simulate human hand massage, thereby further enhancing the massage effect, promoting blood circulation, increasing oxygen and nutrient supply to bodies, effectively relieving muscle tension and pain, and accelerating physical recovery.

In the busy life, massage devices have become one of effective ways for people to relieve stress and anxiety, show the perfect combination of technology and humanized design, and meet people's pursuit of health and comfort. However, traditional massage devices still have some shortcomings in applications:

1. gap between mover and stator: to save space, a stator core is designed as a long bar with a thin yoke part, which makes the stator core easily attracted by the strong magnet to bend and deform towards two sides of the strong magnet, so that it is not easy to control perpendicularity; to ensure the normal operation of the linear motor, a gap between a mover and a stator must be increased, which increases electromagnetic loss, reduces the efficiency of the motor, easily affects output, and leads to relatively instable overall performance;
2. structural complexity and stability: a linear motor of a traditional massage device is complex in stator structure and numerous in assemblies, the overall structure is inconvenient to disassemble and restore, is easily damaged after disassembly, and inconvenient for later maintenance and replacement, and the overall connection structure is insufficiently strong, which easily leads to the instability of the overall structure, deformation under external forces, noise, mechanical failure, and even motor scrap;
3. functionality and efficiency: the stator of the linear motor of the traditional massage device is often in multipolar arrangement, which makes it difficult for the strong magnet to fully cover teeth of the stator of the motor during reciprocating motion, makes an electromagnetic force insufficiently utilized and reduces the efficiency of the motor;
4. costs as well as processing and assembly: the processing and assembly of a mover assembly of the linear motor of the traditional massage devices are complex, a mover bracket, a push rod, a massage head and a piston are designed separately and are fixed with glue, which increases processing steps and lowering processing and assembly precision and structural stability, thereby increasing the cost of the motor and reducing a qualification rate; moreover, due to the bipolar design of the core shaped like the long bar, a special winding machine is required to be developed and customed, which increases the investment cost of production equipment and the complexity of winding processing, leads to a higher defect rate of winding groups; and
5. production process and safety: the overall production process is relatively complex, which requires additional mold investment, workpiece processing, and motor assembly and maintenance costs, so that the cost is higher; moreover, due to a strong magnetic force of the strong magnet, a risk of pinching injuries easily occurs during manual assembly, which necessitates improvements in safety.

SUMMARY

In view of the shortcomings in the prior art, a main object of the present invention is to provide a massage device based on a novel linear motor to solve the technical issues of relatively complex production process, higher cost, insufficient structural stability, inconvenience in disassembly and restoration, susceptibility to damage, high overall energy consumption, relatively instable output performance, and inadequate production safety of a traditional massage device.

To achieve the above object, the present invention employs the following technical solution:

The present invention discloses a massage device based on a novel linear motor, including:
  a motor end cover, wherein the motor end cover includes a first end cover and a second end cover;
  a motor assembly, wherein the motor assembly includes an axially punched and laminated magnetic guide core, a holding through cavity is formed in a core of the magnetic guide core, clamping slots are formed in two opposite side walls of the holding through cavity, axially punched and laminated winding cores are mounted in the clamping slots, winding frames are mounted on the winding cores, winding grooves in which a plurality of layers of coils are wound are formed in the winding frames, a mover bracket which is mounted between the two winding cores and in which a strong magnet is clamped is further disposed in the holding through cavity, and a transmission push rod is disposed on an axial end of the mover bracket; and
  a massage assembly, wherein the massage assembly is mounted on an end, away from the motor assembly, of a guide through hole and is connected to a transmission end of the motor assembly.

As a preferred solution, the massage device based on the novel linear motor further includes a motor end cover, the motor end cover includes a first end cover and a second end cover, the motor assembly is disposed between the first end cover and the second end cover, and the guide through hole corresponding to the transmission push rod is formed in the first end cover and/or the second end cover.

Mounting through holes are formed in two sides, where the winding cores are mounted, of the magnetic guide core, and are separately disposed in two sides of the clamping slots, and fixing columns adapted to the mounting through holes are disposed on ends, close to the magnetic guide core, of the first end cover and the second end cover.

As a preferred solution, the winding cores includes connection cores, clamping convex blocks, and inductive convex blocks, the clamping convex blocks are connected to the inductive convex blocks via the connection cores, are disposed on ends, away from the mover bracket, of the connection cores, and are adapted to the clamping slots, and the winding frames are disposed between the clamping convex blocks and the inductive convex blocks and are detachably mounted on the connection cores.

As a preferred solution, radial dimensions of the clamping convex blocks are equal to radial dimensions of the connection cores, the winding frames are annular and are adapted to the connection cores in inner diameters, and the winding frames are mounted on the connection cores after passing through the clamping convex blocks.

As a preferred solution, grooves are formed in two opposite sides of the connection cores, the winding frames are "U"-shaped, clamping hooks are disposed in openings of the winding frames, and the winding frames are embedded in the grooves and are fixedly connected to the connection cores via the clamping hooks.

As a preferred solution, the winding frames include two symmetrically-disposed U-shaped frame bodies separately disposed on two axial sides of the winding cores, opening sides of the two U-shaped frame bodies are oppositely disposed and are embedded in the winding cores, and the opening sides of the U-shaped frame bodies are connected in a clamping way.

As a preferred solution, the massage device based on the novel linear motor further includes a transmission mechanism, the motor assembly is connected to the massage assembly by the transmission mechanism, and the transmission mechanism is configured to convert linear reciprocating motion of the transmission push rod into a flapping and/or tapping action of the massage assembly.

As a preferred solution, a holding cavity is formed in the mover bracket, a plurality of limit blocks are disposed on one end of the holding cavity, elastic clamping blocks are disposed on the other end of the holding cavity, the strong magnet is mounted in the holding cavity and is connected to the mover bracket in a clamping way via the elastic clamping blocks, the strong magnet is equally divided, in an axial direction, into two areas with opposite magnetic poles or into two strong magnets of equal area and opposite magnetic poles, and two opposite radial magnetic forces exist in the axial areas in the axial direction of the strong magnet.

As a preferred solution, the massage assembly is connected to an end, away from the mover bracket, of the transmission push rod, the massage assembly includes, but is not limited to, a piston-type suction assembly, a vortex-type suction assembly, an impeller-type suction assembly, a cyclone-type suction assembly, a cam-type suction assembly, an eccentric wheel-type suction assembly, and a screw-type suction assembly, the piston-type suction assembly includes a piston member and a suction member, the piston member is disposed the guide through hole and is fixedly connected to the transmission push rod, the suction member is located on an end, away from the motor assembly, of the guide through hole, and a fixing groove on which a sealing rubber ring is mounted is further formed in a peripheral side, in contact connection with the guide through hole, of the piston member.

As a preferred solution, avoidance bevels are disposed on ends close to the mover bracket, of the winding frames.

Compared with the prior art, the present invention has distinct advantages and beneficial effects, specifically, it can be known from the above-mentioned technical solutions that:

1. optimizing a gap between a mover and a stator: the modular clamping design of the "T"-shaped or "I"-shaped winding cores makes it easy to control and adjust lateral dimensions of the winding cores, simplifies the control on a gap between each of the winding cores and the mover bracket, is beneficial to further reduction of the gap between each of the winding cores and the mover bracket, decreases electromagnetic loss, and increases the efficiency of the motor;
2. simplifying a structure and enhancing stability: after the winding cores and the magnetic guide core are both designed to be axially punched and laminated to form cylinders, a magnetic attraction force exerted by the strong magnet on the magnetic guide core is effectively mitigated, the possibility of bending deformation of the magnetic guide core is reduced, the overall stability of the mechanism is enhanced, it is easy to control the perpendicularity, and the overall output performance is relatively stable; and by means of modular assembly, the number of members is reduced, the disassembly and assembly processes are simplified, not only is the overall structural stability improved, and are deformation and noise under external forces reduced, but also the risk of mechanical failure is reduced, and the service life of the motor is prolonged;
3. enhancing functionality and efficiency: by optimizing the arrangement of the strong magnet, the object of fully covering teeth of the stator of the motor is achieved, then, an electromagnetic force is sufficiently utilized, and the efficiency of the motor is increased; in addition, by the optimized structure, ineffective travel during reciprocating motion is reduced, which further enhances the performance and efficiency of the motor;
4. reducing costs and increasing processing and assembly efficiency: by means of the modular design, steps for fixation with glue are reduced, processing and assembly precision and structural stability are improved, not only is the cost of the massage device reduced, and a qualification rate increased, but also a winding process is simplified, and the complexity of production equipment and processes is lowered; and
5. simplifying a production process and enhancing safety: the production process is optimized as a whole, the costs of molds, workpiece processing, and motor assembly and maintenance are reduced; and the optimized structure simplifies a manual assembly process, reduces the risk of pinching injuries, and enhances the safety of the production process.

In order to clearly describe the structural features and effects of the present invention, the present invention will be described in detail below in conjunction with the drawings and specific embodiments.

Figure 1:
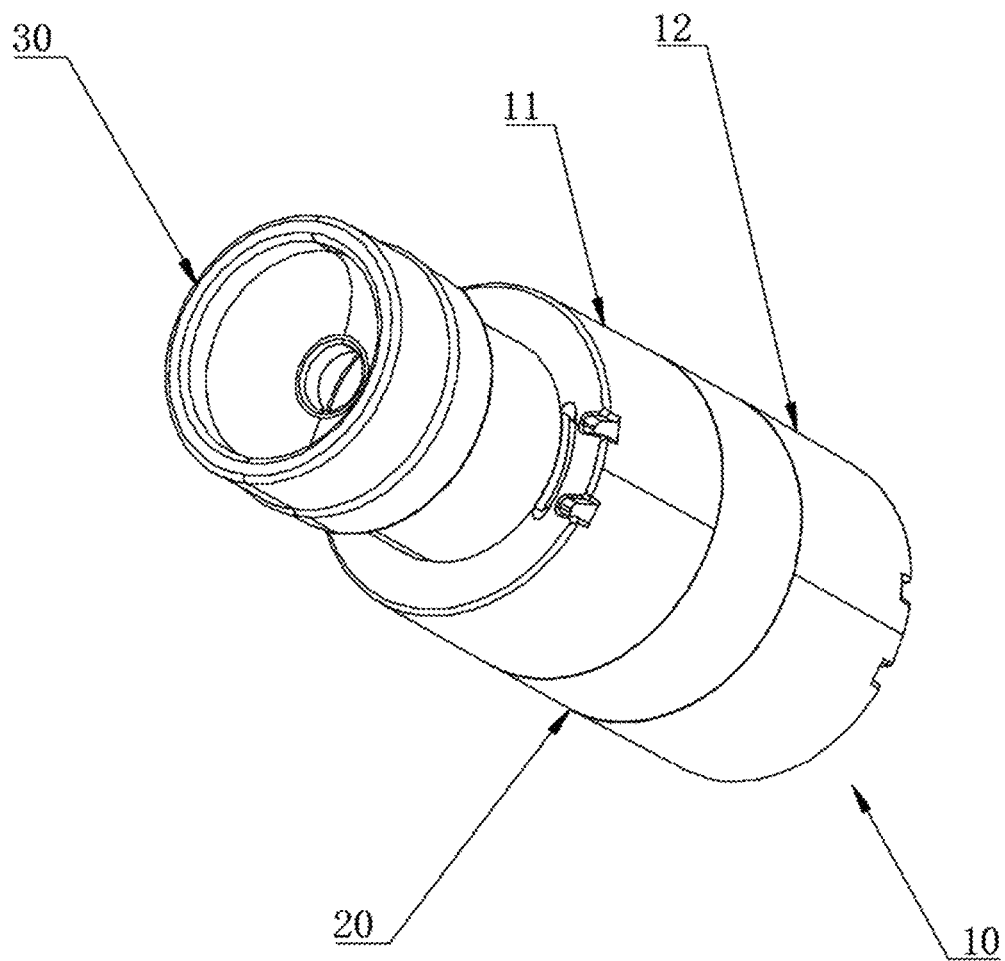
FIG. 1 is a schematic view of an assembly structure of a massage device in embodiments 1-4 of the present invention.
Figure 2:
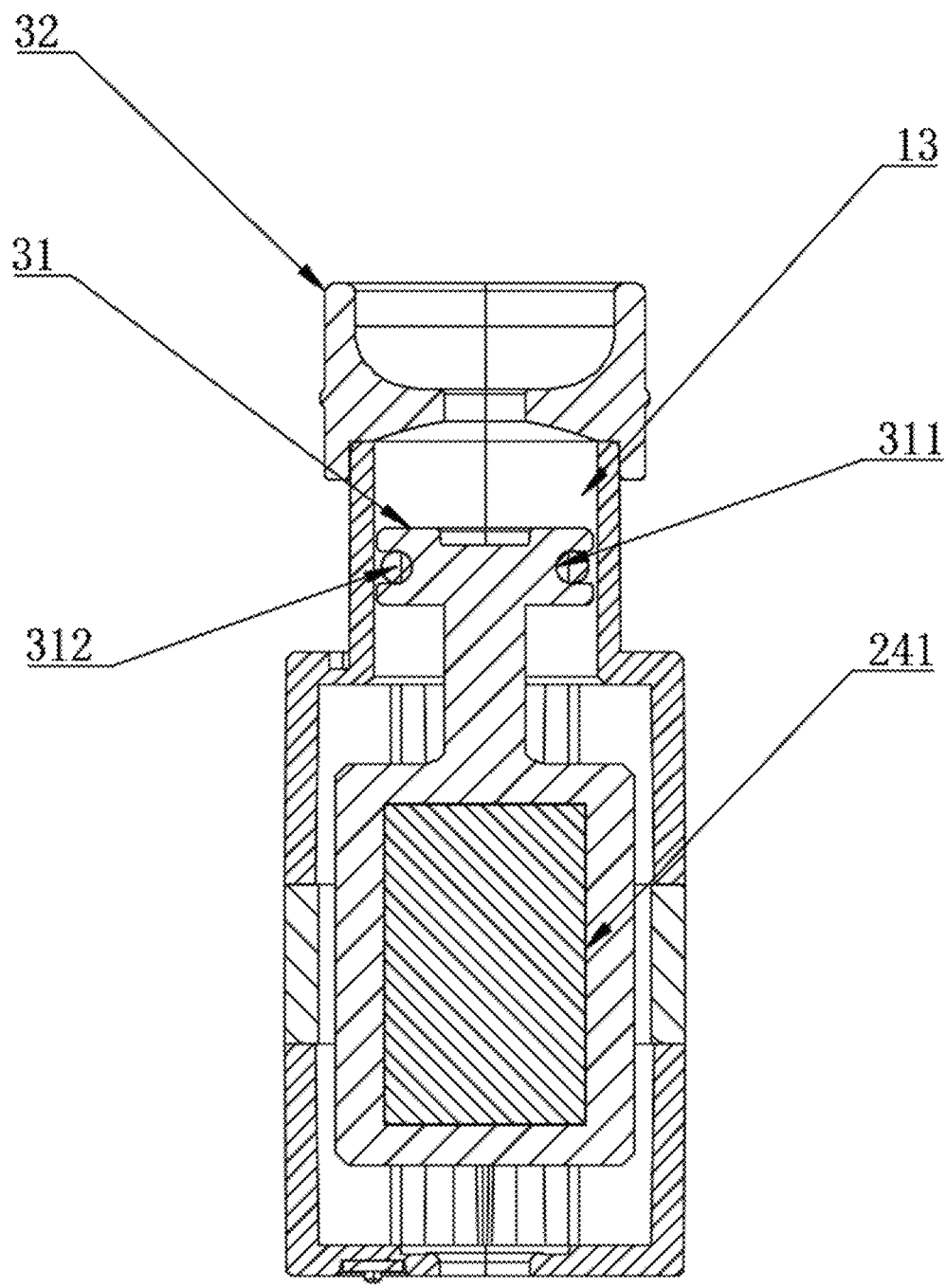
FIG. 2 is a cross-sectional view of the massage device in embodiments 1-4 of the present invention.
Figure 3:
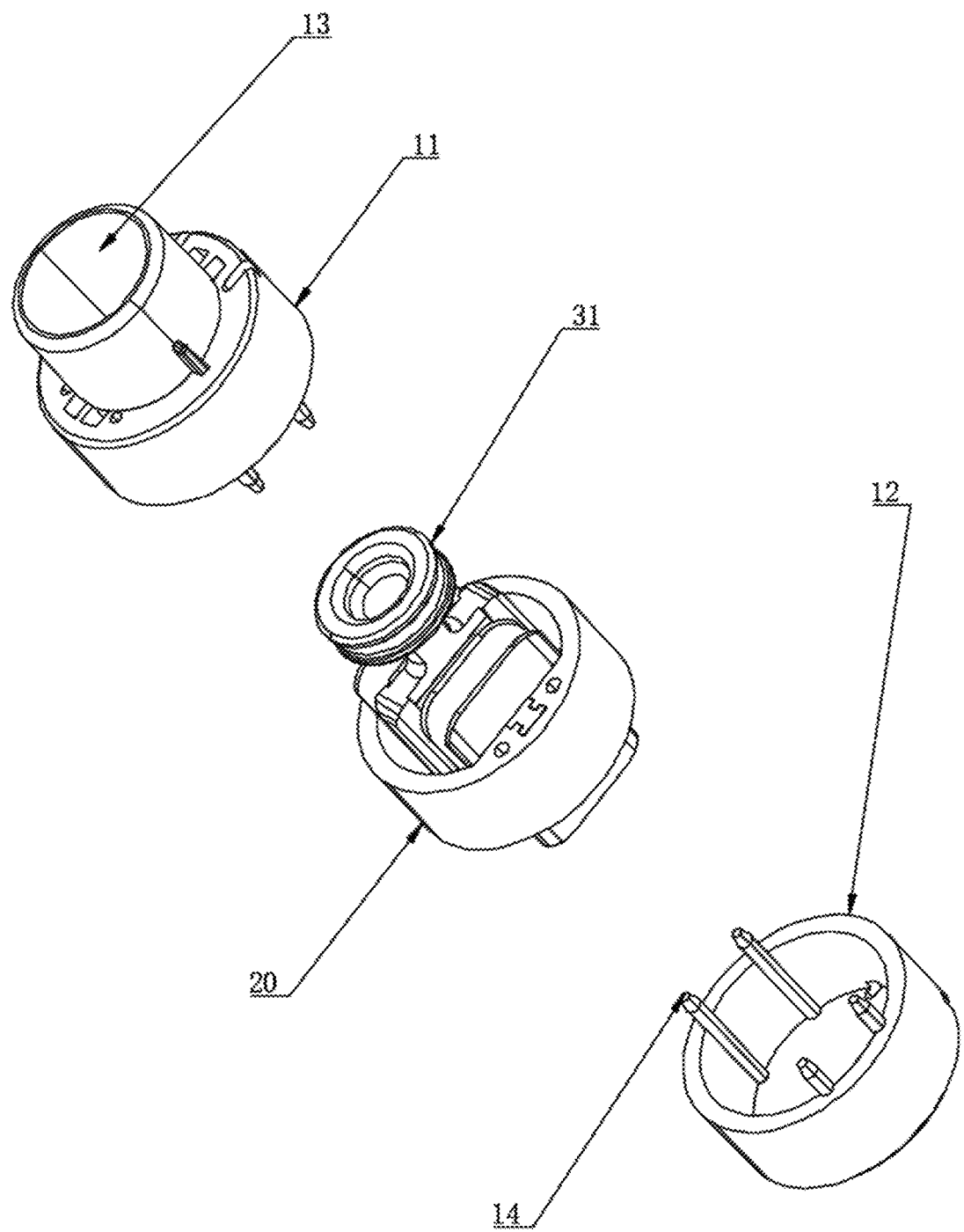
FIG. 3 is a schematic exploded view of a partial structure of the massage device in embodiments 1-4 of the present invention.

DESCRIPTION FOR REFERENCE NUMERALS IN THE DRAWINGS 10, motor end cover; 11, first end cover; 12, second end cover; 13, guide through hole; 14, fixing column;
20, motor assembly; 21, magnetic guide core; 211, holding through cavity; 212, clamping slot; 213, mounting through hole; 22, winding core; 221, clamping convex block; 222, connection core; 223, inductive convex block; 224, groove; 23, winding frame; 231, winding groove; 232, clamping hook; 233, avoidance bevel; 234, U-shaped frame body; 24, mover bracket; 241, holding cavity; 242, limit block; 243, elastic clamping block; 25, strong magnet; 26, transmission push rod; 261, first groove;
30, massage assembly; 301, first massage assembly; 302, second massage assembly; 31, piston member; 311, fixing groove; 312, sealing rubber ring; 32, suction member;
40, upper shell; 41, movable turbine; 42, lower shell; 43, eccentric turbine; 44, air inlet/outlet hole;
50, fixing shell; 51, impeller member; 52, seal plate; 53, air hole;
60, transmission mechanism; 61, rotating arm; 611, second groove; 62, rotating shaft; 63, control rod;
70, transmission mechanism; 71, first rotating member; 72, second rotating member; 73, rotating shaft; 74, connecting arm;
80, transmission mechanism; 81, first rotating member; 82, second rotating member; 83, rotating shaft; 84, connecting arm;
90, transmission mechanism; 91, first rotating member; 92, second rotating member; 93, rotating shaft; 94, connecting arm; 941, first connecting arm; and 942, second connecting arm.

DETAILED DESCRIPTION OF THE EMBODIMENTS

To further clarify the objects, technical solutions, and advantages of the present invention, the following detailed explanation is provided in conjunction with the drawings and specific embodiments. It should be understood that these specific embodiments described herein are intended solely to illustrate the present invention, rather than to limit its scope.

It should be noted that when an element is referred to as being "fixed to" another element, it can be directly located on the another element or intervening elements may also exist. When an element is considered to be "connected to" another element, it can be directly connected to another element or intervening elements may exist. The terms "vertical," "horizontal," "left," "right," and similar expressions used herein are solely for descriptive purposes.

Initially, applicable scenarios of the present application are introduced.

The present application can be applied to the technical field of massage apparatuses. In today's fast-paced life, people's attention to health and quality of life is increasing. With this trend, massage technology has received significant attention, leading to the emergence of massage devices. These massage devices aim to provide personalized and targeted massage experience to meet diverse needs of individuals. They integrate advanced technology and ergonomic design to offer the optimal comfort level and effects during use. By equipping intelligent control systems, users can adjust the massage intensity, mode, and parts according to personal preferences and physical conditions to achieve the most suitable massage experience. At the same time, the massage devices employ various techniques such as kneading, vibrating, and tapping to simulate human hand massage, thereby further enhancing the massage effect, promoting blood circulation, increasing oxygen and nutrient supply to bodies, effectively relieving muscle tension and pain, and accelerating physical recovery.

In the busy life, massage devices have become one of effective ways for people to relieve stress and anxiety, show the perfect combination of technology and humanized design, and meet people's pursuit of health and comfort. However, traditional massage devices still have the shortcomings as described in the background art.

Based on this, refer to FIGS. 1 to 9, embodiments 1-6 of the present invention provide a massage device based on a novel linear motor, including:

a motor end cover 10, the motor end cover 10 including a first end cover 11 and a second end cover 12 which play protecting and supporting roles;

a motor assembly 20, wherein the motor assembly 20 is disposed between the first end cover 11 and the second end cover 12, and acts as a core driving part to provide a power source;

refer to FIGS. 4 to 7, the motor assembly 20 includes an axially punched and laminated magnetic guide core 21, a holding through cavity 211 is formed in a core of the magnetic guide core 21, clamping slots 212 are formed in two opposite side walls of the holding through cavity 211, axially punched and laminated winding cores 22 are mounted in the clamping slots, winding frames 23 are mounted on the winding cores 22, winding grooves 231 in which a plurality of layers of coils are wound are formed in the winding frames 23, a mover bracket 24 which is mounted between the two winding cores 22 and in which a strong magnet 25 is clamped is further disposed in the holding through cavity 211, a transmission push rod 26 is disposed on an axial end of the mover bracket 24, and a guide through hole 13 corresponding to the transmission push rod 26 is formed in the first end cover 11 and/or the second end cover 12; by means of the axially punched and laminated design, the overall structural stability is enhanced, and it is easy to control the perpendicularity; by means of the modular clamping design of the winding cores 22, it is easy to control and adjust lateral dimensions of the winding cores 22, further reduction of a gap between each of the winding cores 22 and the mover bracket 24 is facilitated, the electromagnetic loss is decreased, the efficiency of the motor is increased, and the overall performance output is relatively stable; moreover, by means of the detachable mounting of the winding frames 23, it is unnecessary to develop and custom a special winding machine for winding, which reduces the investment cost of production equipment and the complexity of winding processing, simplifies a process, and reduces the defect rate of winding groups; and at the same time, by means of the modular design, the assembly processes is further simplified, a risk of pinching injuries from a strong magnetic force of the strong magnet 25 during assembly can be avoided, and the assembly and processing safety is enhanced;

a massage assembly 30, wherein the massage assembly 30 is mounted on an end, away from the motor assembly 20, of the guide through hole 13 and is connected to a transmission end of the motor assembly 20, and the massage assembly 30 performs various massage operations under the drive of the motor assembly 20 to meet needs of different users.

Mounting through holes 213 are formed in two sides, where the winding cores 22 are mounted, of the magnetic guide core 21, and are separately disposed in two sides of the clamping slots 212, fixing columns 14 adapted to the mounting through holes 213 are disposed on ends, close to the magnet guide core 21, of the first end cover 11 and the second end cover 12, and both the first end cover 11 and the second end cover 12 are mounted on two sides of the magnetic guide core 21 via the fixing columns 14, so that the first end cover 11, the second end cover 12 and the magnetic guide core 21 have the same co-axiality, and the magnetic guide core 21 is clamped and fixed between the first end cover 11 and the second end cover 12 to form a stable structure without additional fasteners, costs are reduced, the quick assembly and disassembly of the first end cover 11 and the second end cover 12 with the magnetic guide core 21 is also achieved, maintenance and disassembly processes are simplified, and later maintenance and mounting are facilitated.

The winding cores 22 include connection cores 222, clamping convex blocks 221, and inductive convex blocks 223, and the clamping convex blocks 221 are connected to the inductive convex blocks 223 via the connection cores 222. The demand on modular assembly is taken into account in the design of the winding cores 22, wherein by means of the combination of the connection cores 222, the clamping convex blocks 221, and the inductive convex blocks 223, the winding cores 22 are more compact in structure and are easier to assemble and disassemble. The clamping convex blocks 221 are disposed on ends, away from the mover bracket 24, of the connection cores 222 and are adapted to the clamping slots 212, thereby ensuring the stability of the connection between each of the winding cores 22 and the magnetic guide core 21. The winding frames 23 are disposed between the clamping convex blocks 221 and the inductive convex blocks 223 and are detachably mounted on the connection cores 222, which not only considers the space for coil winding, but also ensures the method of mounting the winding frames 23 onto the connection cores 222, makes it unnecessary to develop and custom a special winding machine for winding, reduces the investment cost, simplifies a process, and enhances production efficiency and convenience for maintenance.

The winding cores 22 are designed to be "T"-shaped or "I"-shaped, which meets diverse mounting needs, not only meets space needs for coil winding, but also ensures stability of connections, and enhances the overall performance and stability of the massage device.

Further, a holding cavity 241 is formed in the mover bracket 24, a plurality of limit blocks 242 are disposed on one end of the holding cavity 241, elastic clamping blocks 243 are disposed on the other end of the holding cavity 241, and the strong magnet 25 is mounted in the holding cavity 241 and is connected to the mover bracket 24 in a clamping way via the elastic clamping blocks 243. By means of the design of the limit blocks 242, a stable position of the strong magnet 25 in the holding cavity 241 can be ensured. The design of the elastic clamping blocks 243 facilitates the mounting of the strong magnet 25 while ensuring a stable connection between the strong magnet 25 and the mover bracket 24, thereby ensuring the stability of the strong magnet 25 during operation. By mounting and clamping the strong magnet 25, the production assembly process is simplified, and the assembly efficiency is increased. The strong magnet 25 is equally divided in an axial direction, into two areas with opposite magnetic poles or into two strong magnets with equal area and opposite magnetic poles, and two opposite radial magnetic forces exist in the two areas in the axial direction of the strong magnet 25, which ensures complete electromagnetic force coverage, effectively avoids electromagnetic loss, and enhancing the efficiency of the motor.

Avoidance bevels 233 are disposed on ends, close to the mover bracket 24, of the winding frames 23. By means of the design of the avoidance bevels 233, direct friction between each of the winding frames 23 and the mover bracket 24 during operation of the massage device can be effectively prevented, noise is reduced, the service life of the massage device is further prolonged, and at the same time, such a design also makes mounting and replacement of the winding frames 23 more convenient.

Even more, the massage assembly 30 is connected to an end, away from the mover bracket 24, of the transmission push rod 26, which ensures smooth power transmission from the motor assembly 20 to the massage assembly 30, and achieves various massage actions. Refer to FIG. 1 to FIG. 2, and FIG. 10 to FIG. 15, the massage assembly 30 includes, but is not limited to, a piston-type suction assembly, a vortex-type suction assembly, an impeller-type suction assembly, a cyclone-type suction assembly, a cam-type suction assembly, a eccentric-wheel-type suction assembly, and a screw-type suction assembly. The vortex-type suction assembly, the impeller-type suction assembly, the cyclone-type suction assembly, the cam-type suction assembly, the eccentric-wheel-type suction assembly and the screw-type suction assembly can all be connected to the transmission push rod 26 via transmission reversing members, diverse choices are offered to meet needs of different users and provide more usage experience. The piston-type suction assembly includes a piston member 31 and a suction member 32; the piston member 31 is disposed in the guide through hole 13 and is connected to the transmission push rod 26, and the piston member 31 is integrally fixed with the transmission push rod 26 and is capable of moving along the length of the guide through hole 13 under the drive of the transmission push rod 26. the suction member 32 is disposed on an end, away from the motor assembly 20, of the guide through hole 13; and the piston member 31 is matched with the suction member 32 to achieve massage operations by means of a negative pressure under the drive of the motor assembly 20. A fixing groove 311 on which a sealing rubber ring 312 is mounted is further formed in a peripheral side, in contact connection with the guide through hole 13, of the piston member 31, which enhances the seal between the piston member 31 and the guide through hole 13, and improving the suction massage effect.

Specifically, a structure of the vortex-type suction assembly refers to the invention patent with US202320197426.5. The vortex-type suction assembly includes a lower shell 42, a movable turbine 41, and an upper shell 40. The movable turbine 41 is mounted in a cavity formed by the upper shell 40 and the lower shell 42, the bottom of the movable turbine 41 is connected to the transmission end of the motor assembly 20 via a transmission conversion member, an eccentric turbine 43 is disposed on the movable turbine 41, and a fixed turbine which has an air inlet/outlet hole 44 in the center is disposed on an inner side, corresponding to the eccentric turbine 43, of the upper shell 40.

The impeller-type suction assembly includes a fixing shell 50, an impeller member 51, and a seal plate 52. The impeller member 51 is rotatably mounted on a core of the seal plate 52, an adjustment air chamber corresponding to the impeller member 51 is disposed in the fixing shell 50, the impeller member 51 is disposed in the adjustment air chamber and is connected to the fixing shell 50 via the seal plate 52, the adjustment air chamber is fan-shaped, an air hole 53 is formed in an end, away from the seal plate 52, of the fixing shell 50, the air hole 53 penetrates to the adjustment air chamber and is formed in a side, away from the impeller member 51, of the adjustment air chamber, and the impeller member 51 is connected to the transmission end of the motor assembly 20 via a transmission conversion member.

Embodiment 1

Figure 4:
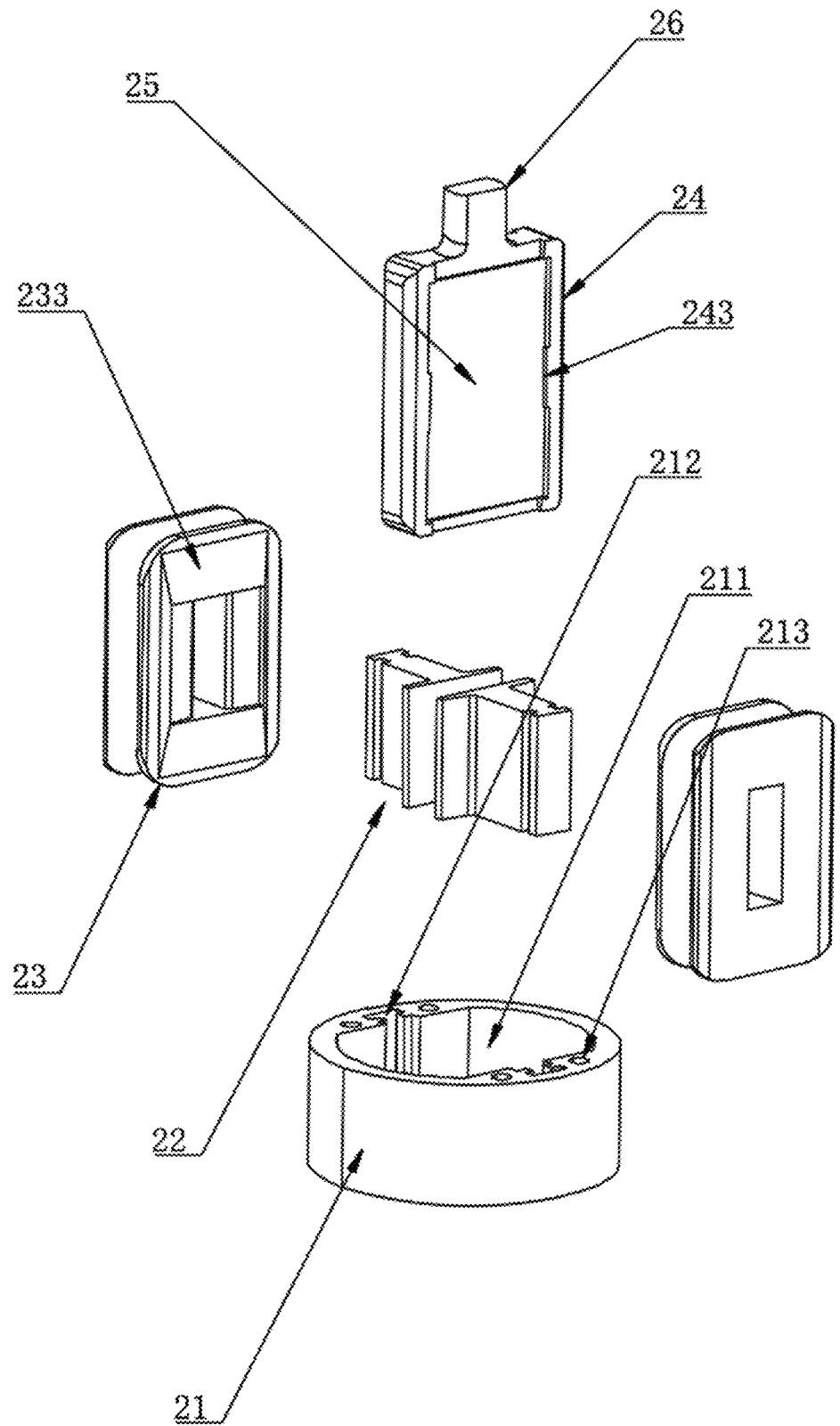
FIG. 4 is a schematic exploded view of a motor assembly in embodiment 1 of the present invention.

Refer to FIG. 4, the winding cores 22 are "T"-shaped, that is, radial dimensions of the clamping convex blocks 221 are equal to radial dimensions of the connection core 222 and are smaller than radial dimensions of the inductive convex blocks 223, the winding frames 23 are annular and are adapted to the connection cores 222 in inner diameters, and the winding frames 23 are mounted on the connection cores 222 after passing through the clamping convex blocks 221. When the winding cores 22 are clamped on the magnetic guide core 21, the winding frames 23 are tightly clamped between each of the inductive convex blocks 223 and the magnetic guide core 21 to fix the winding frames 23. Such a separable design facilitates the winding operation of the winding frames 23 and simplifies the assembly process.

Embodiment 2

Figure 5:
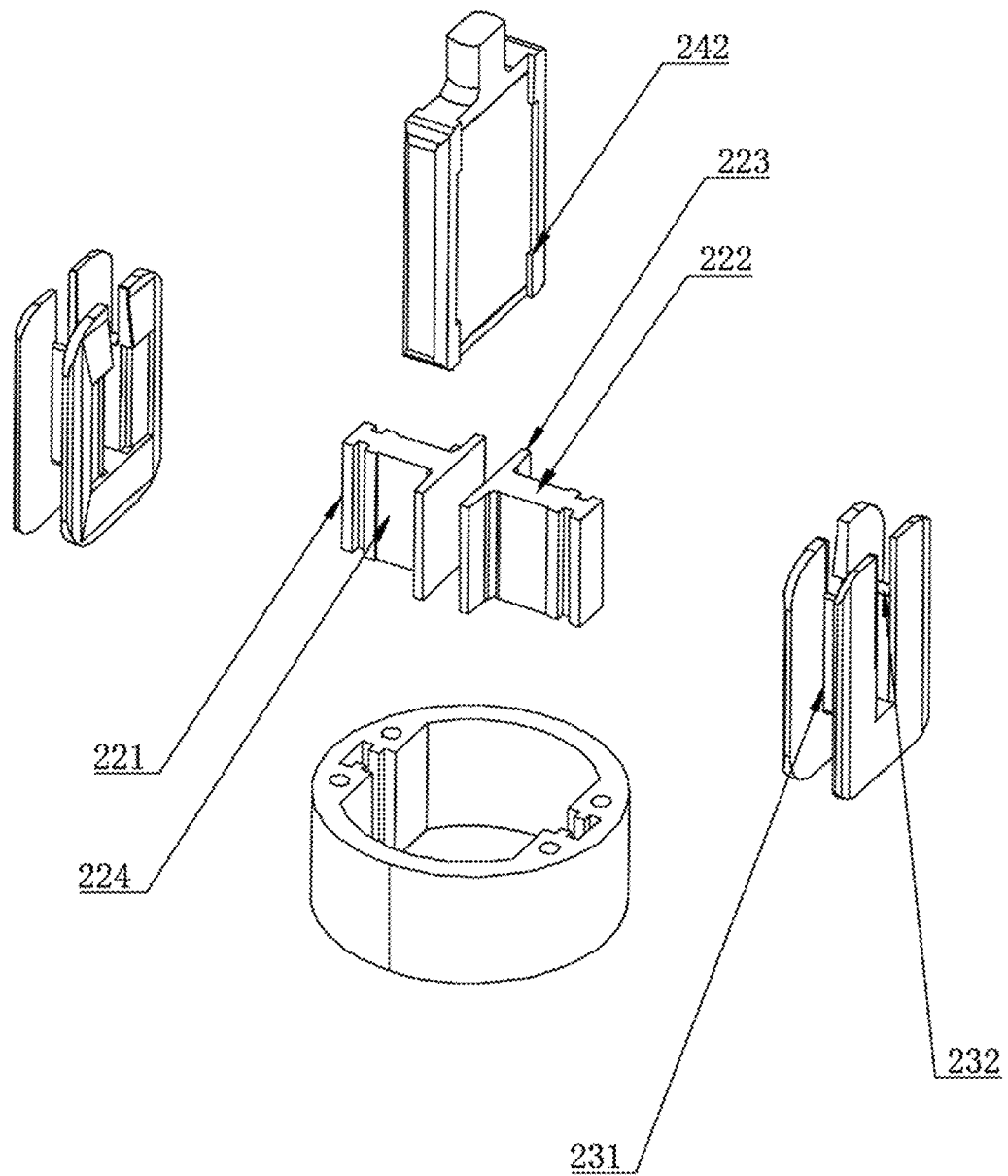
FIG. 5 is a schematic exploded view of a motor assembly in embodiment 2 of the present invention.

Refer to FIG. 5, the winding cores 22 are "T"-shaped, grooves 224 are formed in two opposite sides of the connection cores 222, the winding frames 23 are "U"-shaped, clamping hooks 232 are disposed in openings of the winding frames 23, and the winding frames 23 are embedded in the grooves 224 and are fixedly connected to the connection cores 222 via the clamping hooks 232. By means of the design of the grooves 224 in cooperation with the clamping hooks 232, the stability of connections between the connection cores 222 and the winding frames 23 is enhanced, and the stability of the winding frames 23 after mounting is ensured. At the same time, by means of the "U"-shaped design of the winding frames 23, depths of the winding grooves 231 are increased under the impact of the grooves 224, more space for coil winding is provided, and the efficiency is further increased while the normal operation of the motor assembly 20 is ensured.

Embodiment 3

Figure 6:
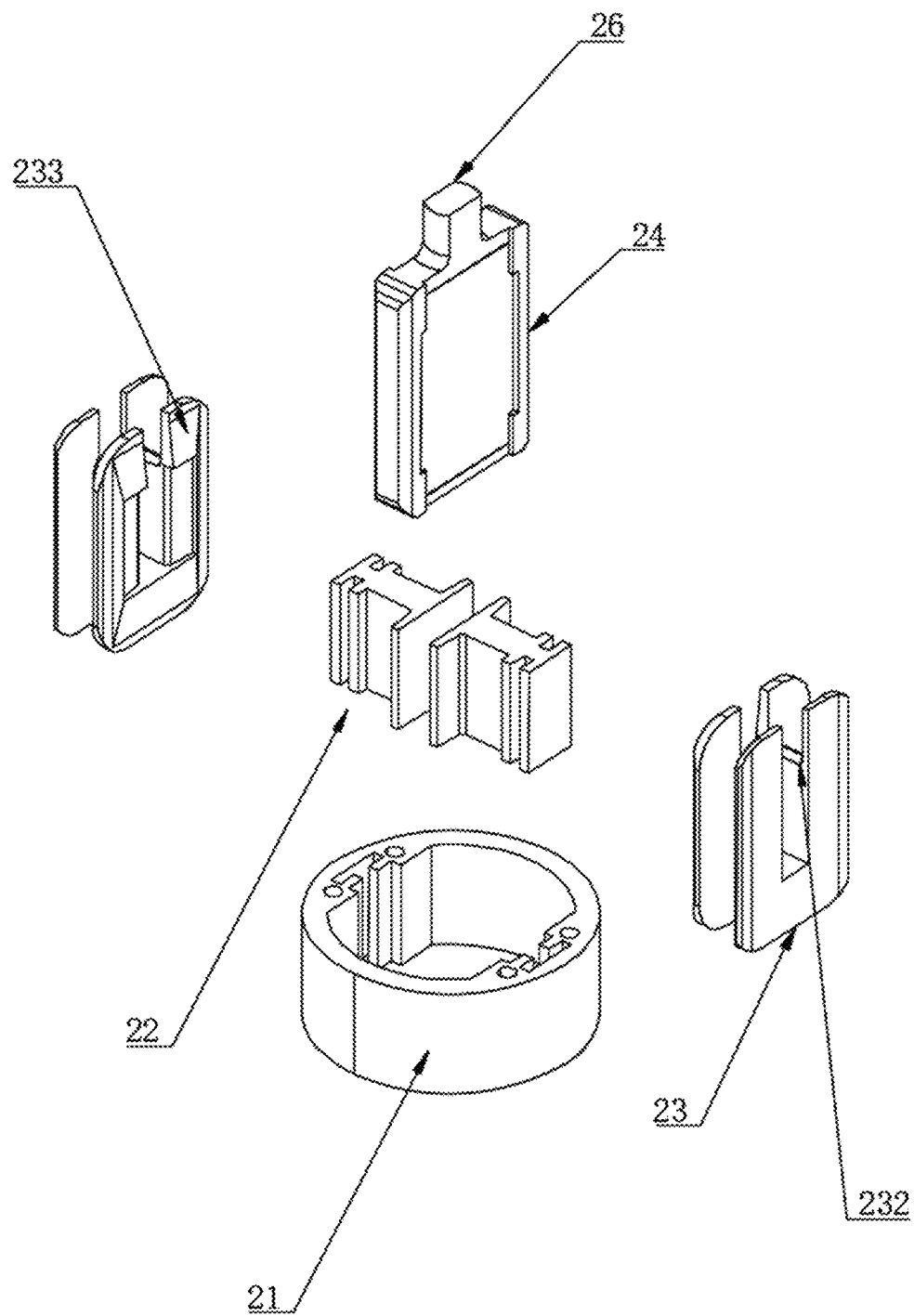
FIG. 6 is a schematic exploded view of a motor assembly in embodiment 3 of the present invention.

Refer to FIG. 6, the winding cores 22 are "I"-shaped, that is, the radial dimensions of the connection cores 222 are smaller than those of the clamping convex blocks 221 and the inductive convex blocks 223. The winding frames 23 are "U"-shaped, clamping hooks 232 are disposed in openings of the winding frames 23, the winding frames 23 are inserted in the connection cores 222 and are fixedly connected to the connection cores 222 via the clamping hooks 232. By means of the design of the clamping hooks 232, the stability of the winding frames 23 after mounting is ensured, and movement during operation is avoided. By means of the "I"-shaped structure, a connection surface between each of the winding cores 22 and the magnetic guide core 21 is increased, the stability of connections is improved, and the smooth output of the motor assembly 20 is further improved.

Embodiment 4

Figure 7:
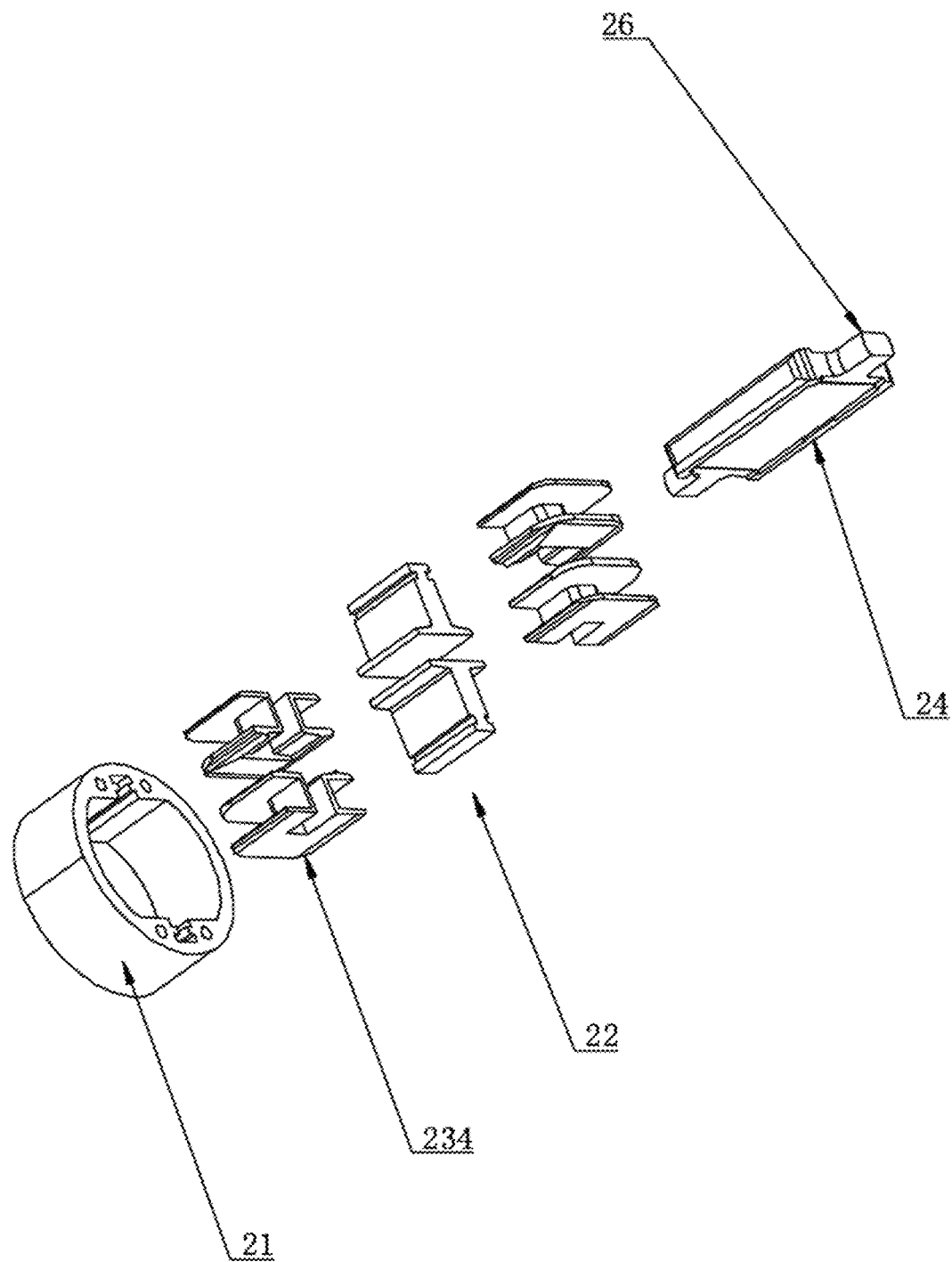
FIG. 7 is a schematic exploded view of a motor assembly in embodiment 4 of the present invention.

Refer to FIG. 7, the winding frames 23 include two symmetrically arranged U-shaped frame bodies 234 separately disposed on two axial sides of the winding cores 22, and opening sides of the U-shaped frame bodies 234 are oppositely disposed and are embedded in the winding cores 22. The symmetrical arrangement of the U-shaped frame bodies 234 ensures the balance of the winding frames 23, and is beneficial to the stable operation of the motor assembly 20. The opening sides of the U-shaped frame bodies 234 are connected in a clamping way, which facilitates disassembly, assembly and maintenance while further enhancing the overall stability of the winding frames 23, and preventing the winding frames 23 from falling or shifting during operation.

Embodiment 5

Figure 8:
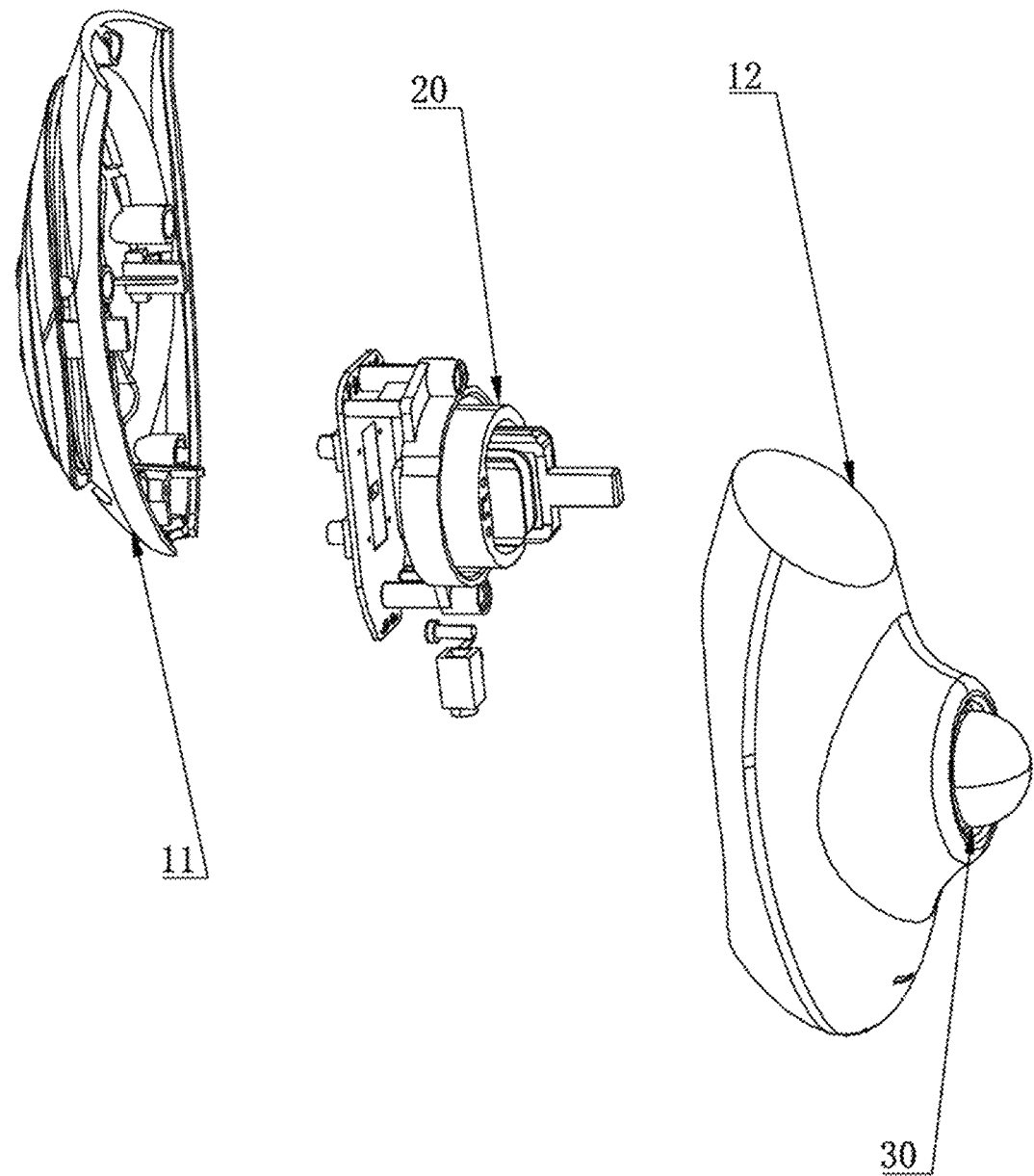
FIG. 8 is a schematic structural exploded view of a massage device in embodiment 5 of the present invention.

Refer to FIG. 8, a transmission push rod 26 is disposed on an end of an axial side of the mover bracket 24, a guide through hole 13 corresponding to the transmission push rod 26 is formed in the first end cover 11 or the second end cover 12, and the massage assembly 30 is mounted on an end, away from the motor assembly 20, of the guide through hole 13 and is connected to the transmission push rod 26, which meets the need for single-sided massage.

Embodiment 6

Figure 9:
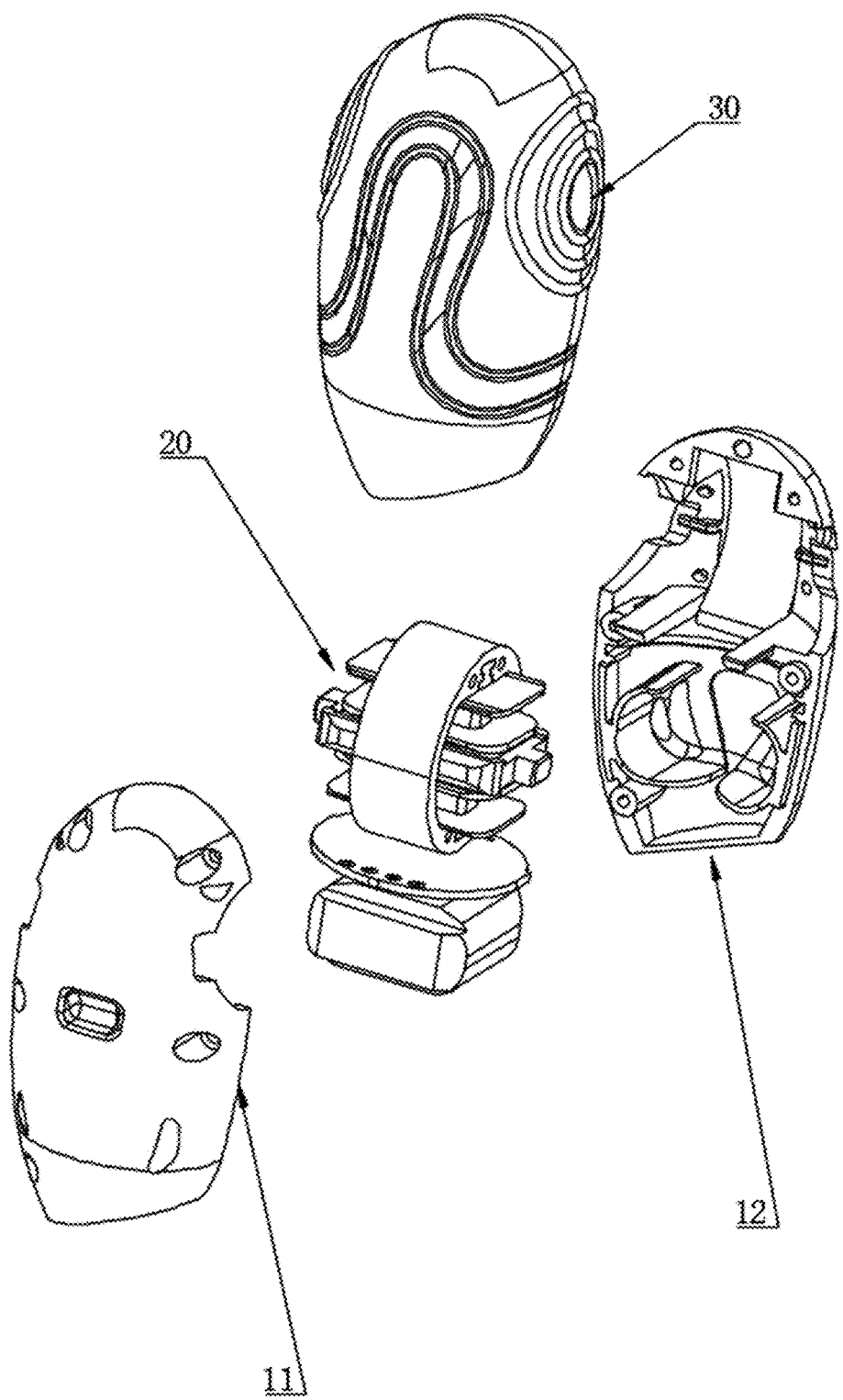
FIG. 9 is a schematic structural exploded view of a massage device in embodiment 6 of the present invention.
Figure 10:
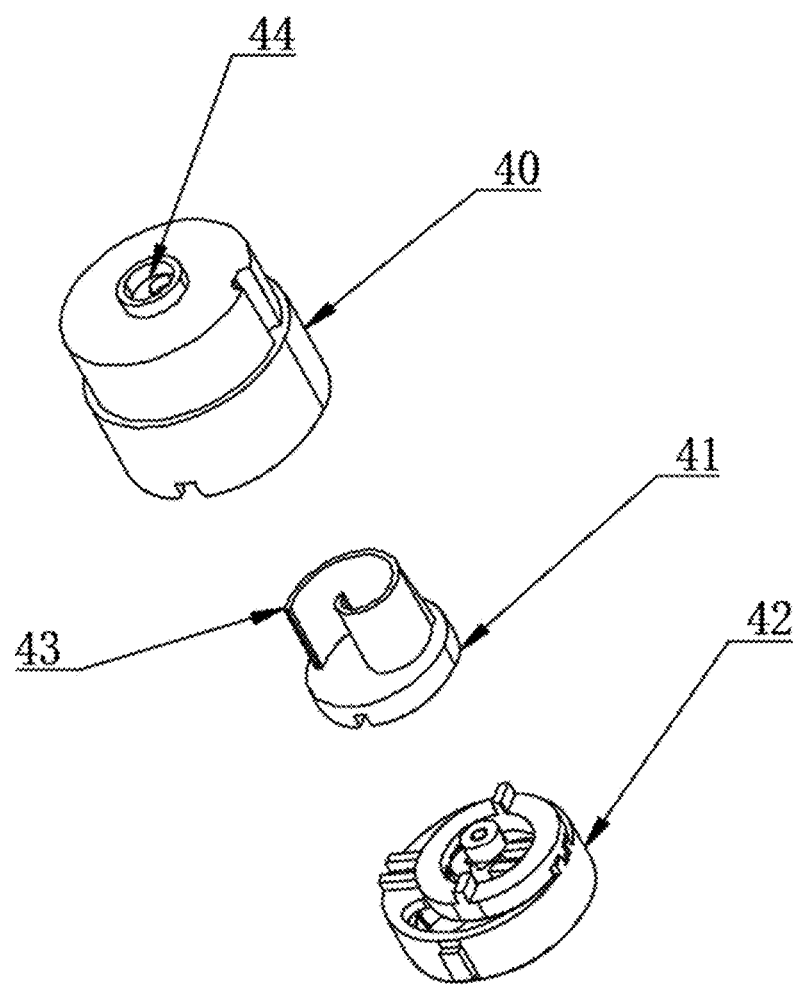
FIG. 10 is a schematic exploded view of a vortex-type suction assembly in embodiments 1-6 of the present invention.
Figure 11:
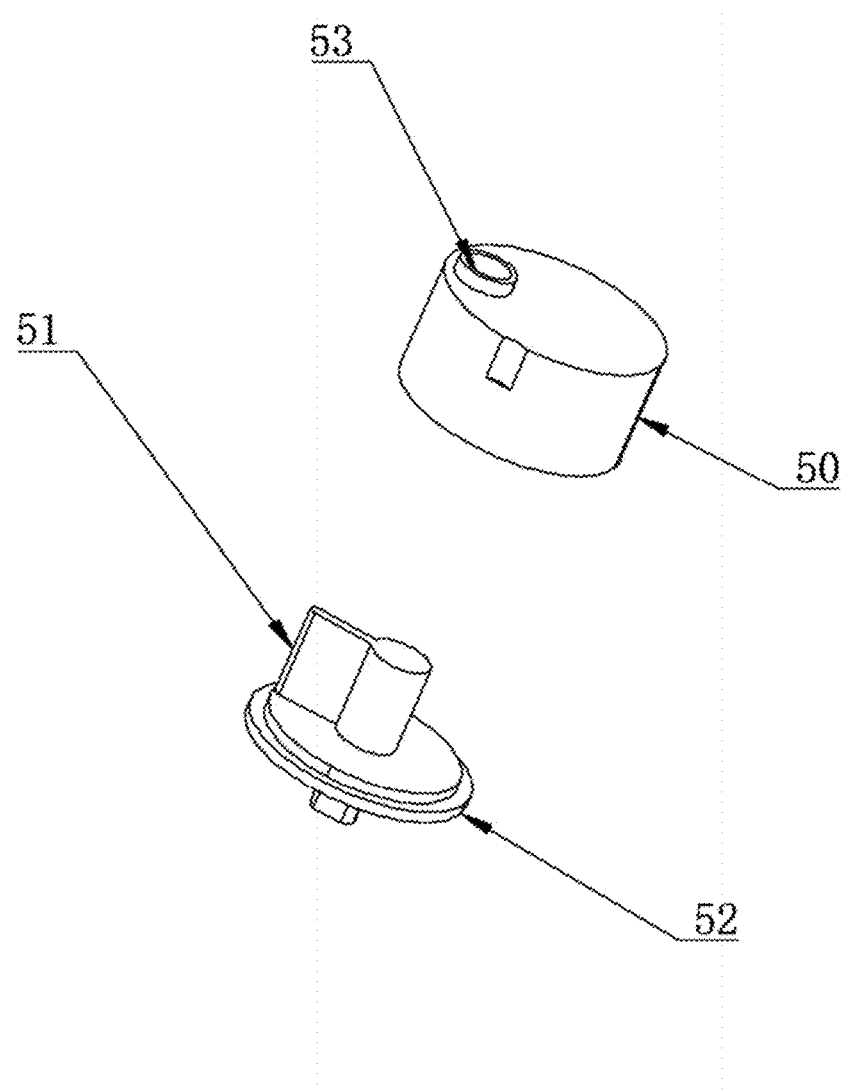
FIG. 11 is a schematic exploded view of an impeller-type suction assembly in embodiments 1-6 of the present invention.
Figure 12:
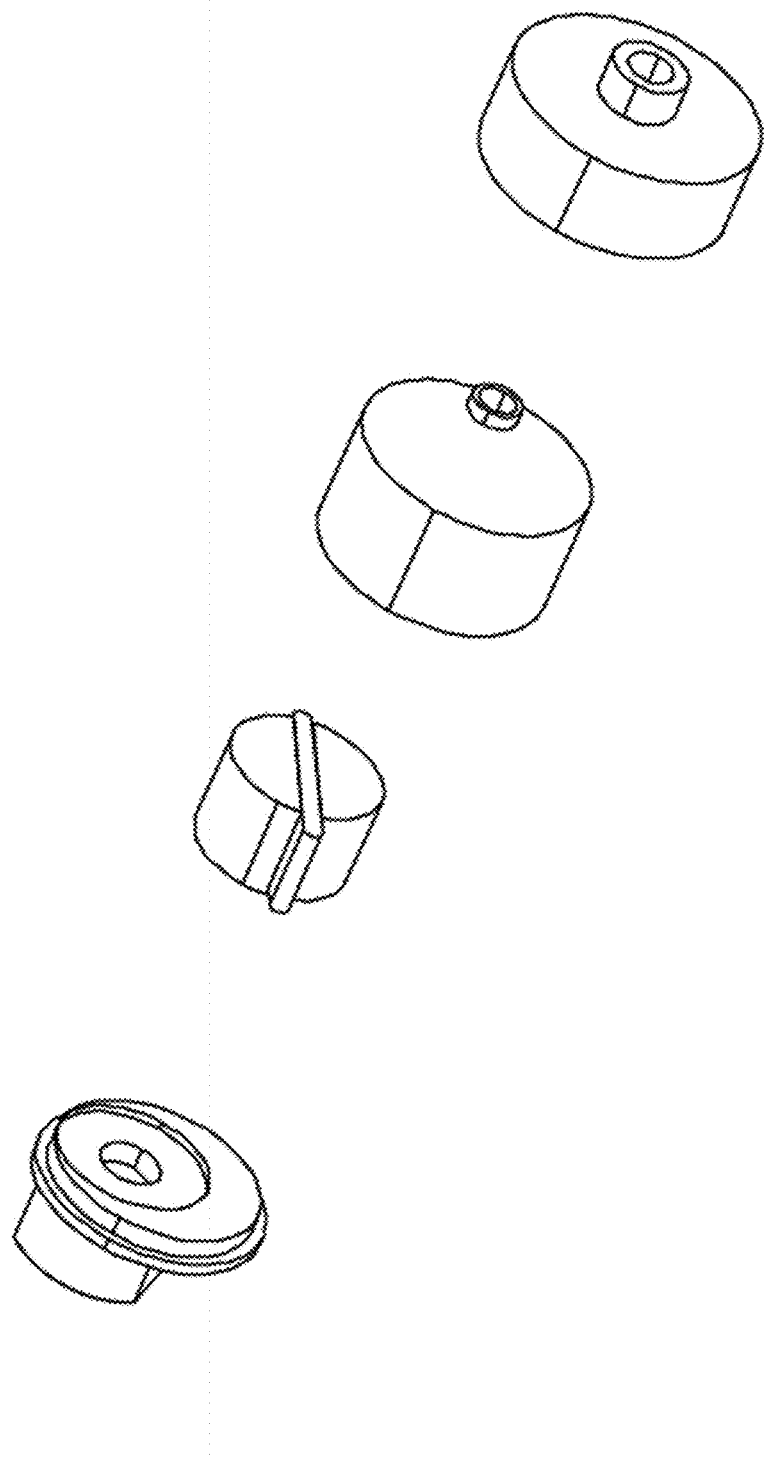
FIG. 12 is a schematic exploded view of a cyclone-type suction assembly in embodiments 1-6 of the present invention.
Figure 13:
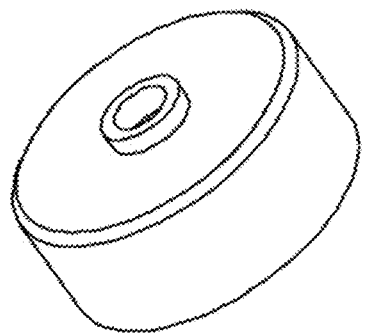
FIG. 13 is a schematic exploded view of a cam-type suction assembly in embodiments 1-6 of the present invention.
Figure 13:
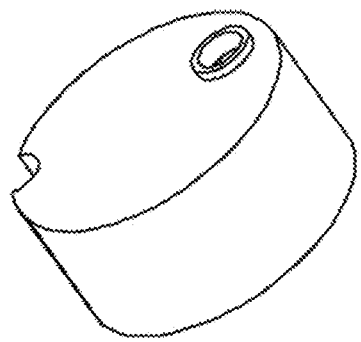
Figure 13:
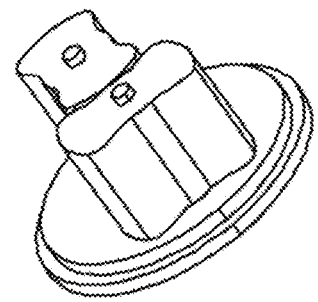
Figure 14:
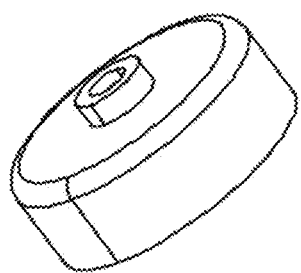
FIG. 14 is a schematic exploded view of an eccentric-wheel-type suction assembly in embodiments 1-6 of the present invention.
Figure 14:
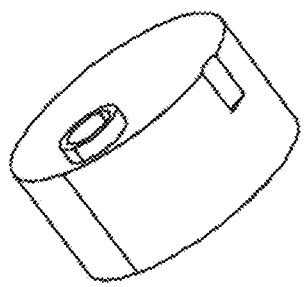
Figure 14:
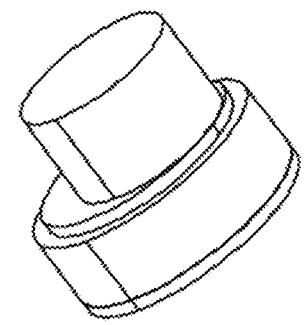
Figure 15:
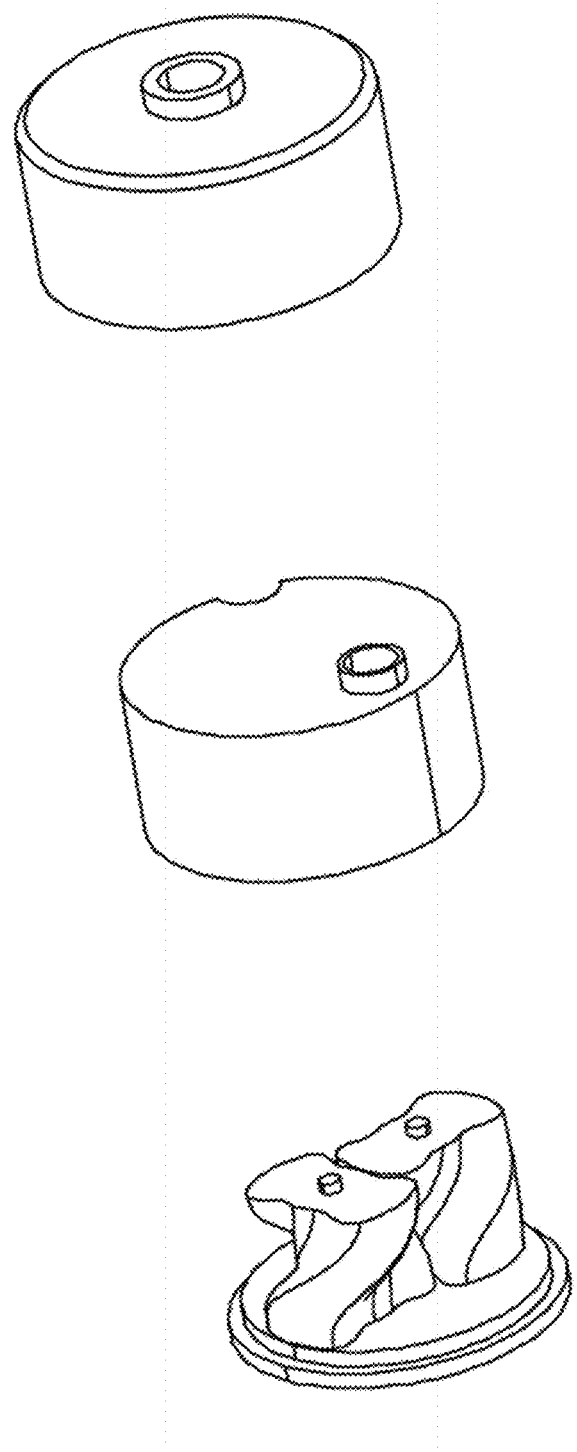
FIG. 15 is a schematic exploded view of a screw-type suction assembly in embodiments 1-6 of the present invention.

Refer to FIG. 9, transmission push rods 26 are disposed on ends of two axial sides of the mover bracket 24, guide through holes 13 corresponding to the transmission push rods 26 are formed in both the first end cover 11 and the second end cover 12, and the massage assembly 30 is mounted on ends, away from the motor assembly 20, of the guide through holes 13 and is connected to the transmission push rods 26, which meets the need for double-sided massage.

Embodiment 7

Figure 16:
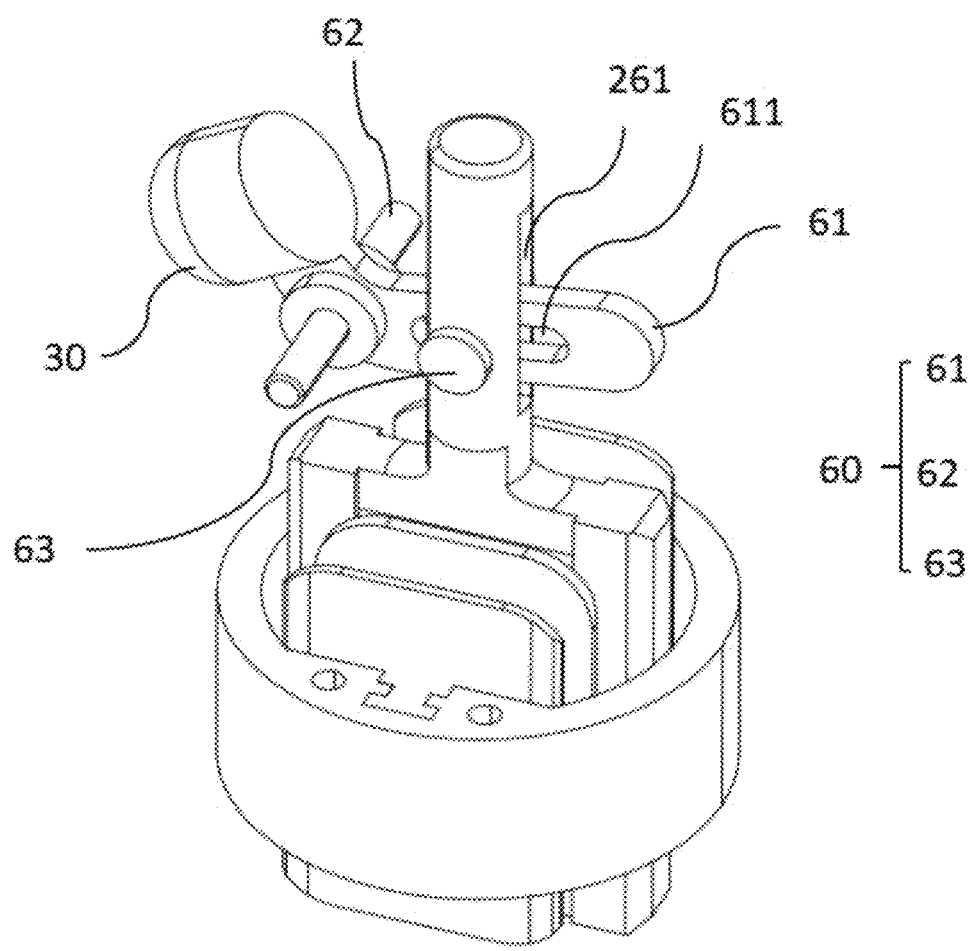
FIG. 16 is a schematic view of a three-dimensional structure in embodiment 7 of the present invention.

Refer to FIG. 16, a transmission mechanism 60 is further disposed between the massage assembly 30 and the transmission push rod 26. The transmission mechanism 60 includes a rotating arm 61, a rotating shaft 62, and a control rod 63. A second groove 611 is formed in an end, close to the transmission push rod 26, of the rotating arm 61, and an end, away from the transmission push rod 26, of the rotating arm 61 is connected to the massage assembly 30. A first groove 261 which is through is formed in a sidewall of the transmission push rod 26, preferably, the center of the first groove 261 passes through a central line of the control rod 63. An end, close to the transmission push rod 26, of the rotating arm 61 passes through the first groove 261, and at least part of the second groove 611 is located in the first groove 261. The control rod 63 passes through both the first groove 261 and the second groove 611, and the rotating arm 61 is slidably fixed to the transmission push rod 26 and the control rod 63. The rotating shaft 62 passes through and is fixedly connected to the rotating arm 61, preferably, the rotating shaft 62 passes through an end, close to the massage assembly 30, of the rotating arm 61, the rotating shaft 62 can also be a part of the rotating arm 61 and protrude out of the rotating arm 61, the rotating shaft 62 is rotatably fixed to the first end cover and/or the second end cover, and the rotating arm 61 can rotate around the rotating shaft 62.

When the transmission push rod 26 moves up and down, the control rod 63 can drive an end, close to the transmission push rod 26, of the rotating arm 61 to move up and down, at the same time, the rotating arm 61 slides relative to the control rod 63 and also rotates around the rotating shaft 62, and an end, away from the transmission push rod 26, of the rotating arm 61 drives the massage assembly 30 to swing. The swing of the massage assembly 30 simulates a pressing or tapping action of human fingers on a human body.

Embodiment 8

Figure 17:
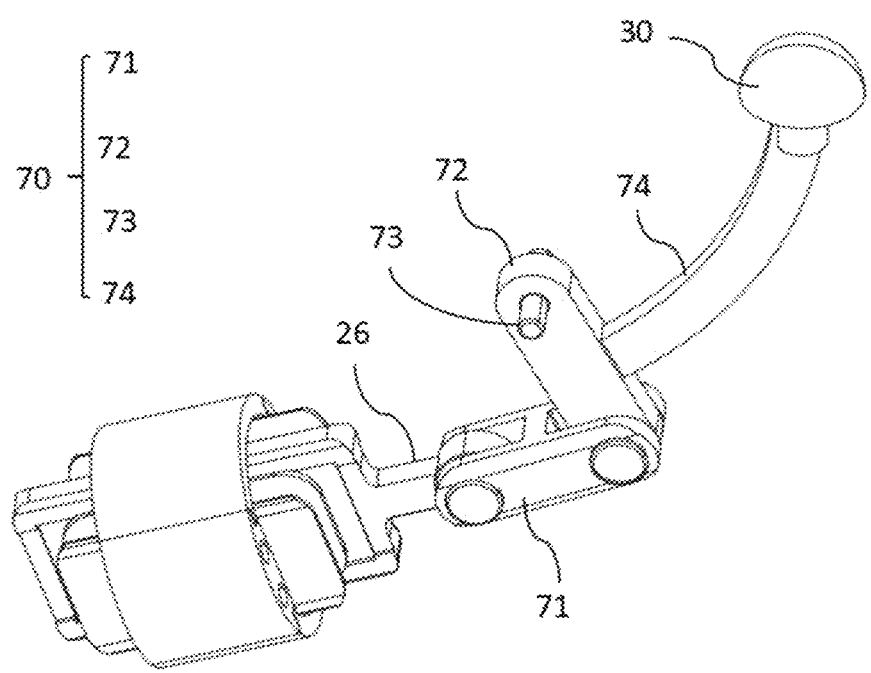
FIG. 17 is a schematic view of a three-dimensional structure in embodiment 8 of the present invention.

Refer to FIG. 17, a transmission mechanism 70 is further disposed between the massage assembly 30 and the transmission push rod 26. The transmission mechanism 70 includes a first rotating member 71, a second rotating member 72, a rotating shaft 73, and a connecting arm 74. One end of the first rotating member 71 is pivotally connected to the transmission push rod 26, and the other end of the first rotating member 71 is pivotally connected to one end of the second rotating member 72. The connecting arm 74 is fixedly disposed on a side of the second rotating member 72, and an end, away from the second rotating member 72, of the connecting arm 74 is fixedly connected to the massage assembly 30. The rotating shaft 73 is disposed on an end, away from the first rotating member 71, of the second rotating member 72, and is rotatably fixed to the first end cover and/or the second end cover, and the second rotating member 72 can rotate around the rotating shaft 73.

The suction member 32 is fixedly disposed on an end, away from the second rotating member 72, of the massage assembly 30, and the suction member 32 can be a hemispherical, semi-elliptical, or specially shaped object, such as a streamlined three-dimensional shape, preferably a hemispherical or semi-elliptical shape. When doing telescoping movement, the transmission push rod 26 pushes the first rotating member 71 to do telescoping movement, the first rotating member 71 drives the second rotating member 72 to swing, and the second rotating member 72 drives the massage assembly 30 to move via the connecting arm 74. The suction member 32 of the massage assembly 30 simulates a tapping action of human fingers on a user, which is equivalent to a tapping action during body massage.

Embodiment 9

Figure 18:
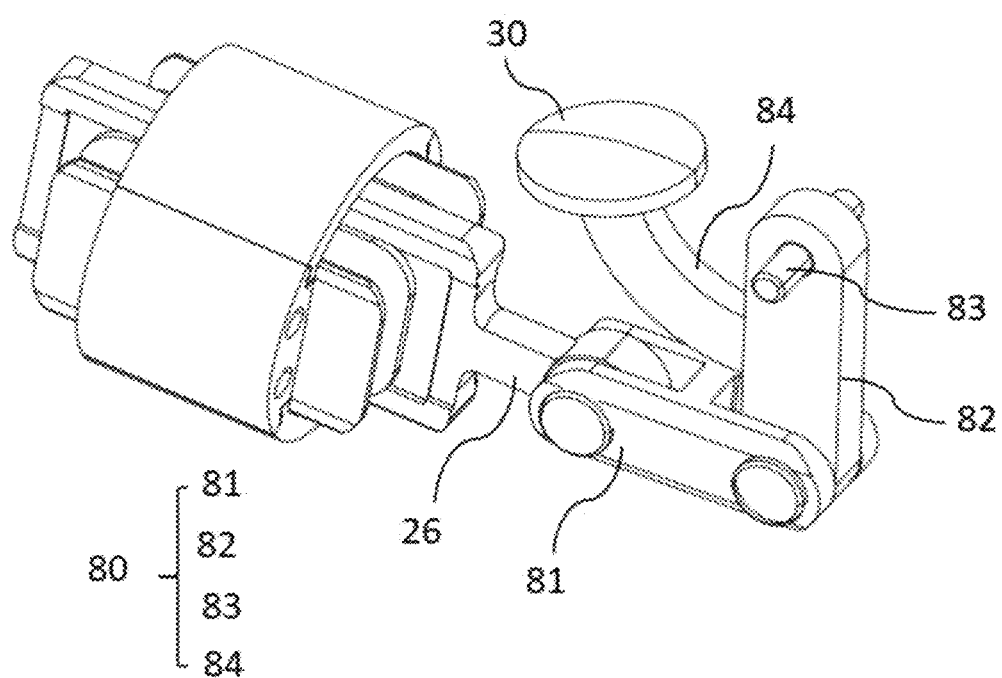
FIG. 18 is a schematic view of a three-dimensional structure in embodiment 9 of the present invention.

Refer to FIG. 18, a transmission mechanism 80 is further disposed between the massage assembly 30 and the transmission push rod 26. The transmission mechanism 80 includes a first rotating member 81, a second rotating member 82, a rotating shaft 83, and a connecting arm 84. One end of the first rotating member 81 is pivotally connected to the transmission push rod 26, and the other end of the first rotating member 81 is pivotally connected to one end of the second rotating member 82. The connecting arm 84 is fixedly disposed on a side of the second rotating member 82, and an end, away from the second rotating member 82, of the connecting arm 84 is fixedly connected to the massage assembly 30. The rotating shaft 83 is disposed on an end, away from the first rotating member 81, of the second rotating member 82, and is rotatably fixed to the first end cover and/or the second end cover, and the second rotating member 82 can rotate around the rotating shaft 83.

The suction member 32 of the massage assembly 30 has a flat-shaped end. When doing telescoping movement, the transmission push rod 26 pushes the first rotating member 81 to do telescoping movement, the first rotating member 81 drives the second rotating member 82 to swing, and the second rotating member 82 drives the massage assembly 30 to move via the connecting arm 84. The flat-shaped end of the massage assembly 30 can perform a tapping action, which is equivalent to a flapping action in body massage.

Embodiment 10

Figure 19:
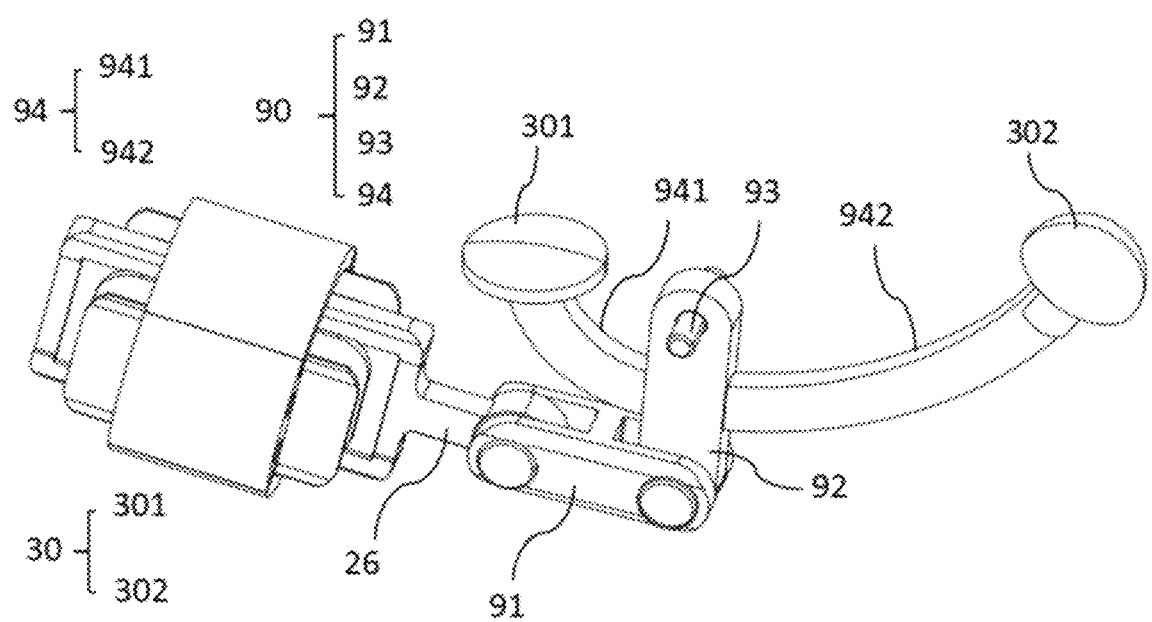
FIG. 19 is a schematic view of a three-dimensional structure in embodiment 10 of the present invention.

Refer to FIG. 19, a transmission mechanism 90 is further disposed between the massage assembly 30 and the transmission push rod 26. The transmission mechanism 90 includes a first rotating member 91, a second rotating member 92, a rotating shaft 93, and a connecting arm 94. The operational principle of embodiment 10 is the same as those of embodiments 8 and 9.

In this embodiment, there are two massage assemblies 30 including a first massage assembly 301 and a second massage assembly 302, there are two connecting arms 94 including a first connecting arm 941 and a second connecting arm 942, the first connecting arm 941 and the second connecting arm 942 are respectively fixed to two sides of the second rotating member 92, an end, away from the second rotating member 92, of the first connecting arm 941 is fixedly connected to the first massage assembly 301, and an end, away from the second rotating member 92, of the second connecting arm 942 is fixedly connected to the second massage assembly 302.

The suction member 32 in the first massage assembly 301 has a flat-shaped end, and the suction member 32 in the second massage assembly 302 can be a hemispherical, semi-elliptical, or specially shaped object, such as a streamlined three-dimensional shape, preferably a hemispherical or semi-elliptical shape. When doing telescoping movement, the transmission push rod 26 can achieve both tapping and flapping actions. When the transmission push rod 26 extends, the first rotating member 91 outwards pushes the second connecting arm 942 via the second rotating member 92, and the second massage assembly 302 on the second connecting arm 942 performs a tapping action. When the transmission push rod 26 retracts, the first rotating member 91 outwards pushes the first connecting arm 941 via the second rotating member 92, and the first massage assembly 301 on the first connecting arm 941 performs a flapping action. Of course, positions of the first massage assembly 301 and the first connecting arm 941 can be swapped with positions of the second massage assembly 302 and the second connecting arm 942 to achieve tapping when the transmission push rod 26 extends and tapping when the transmission push rod 26 retracts.

Preferably, the massage assembly 30, either partially or entirely, is made of a flexible material, and at least a part in contact with a human body is made of the flexible material. The flexible material can enhance comfort levels for users and improve user experience.

In embodiments 5-10, the first end cover 11 and the second end cover 12 can also be two parts which are matched with each other. After assembled together, the first end cover 11 and the second end cover 12 enclose a holding space, the guide through hole 13 is formed in the first end cover 11 and/or the second end cover 12, the suction member 32 is disposed in the guide through hole 13, and preferably, a part of the suction member 32 extends out of the guide through hole 13. The motor assembly 20 is disposed in the holding space, and the motor assembly 20 drives the massage assembly 30 to swing.

The embodiments described above are merely preferred embodiments of the present invention and are not intended to limit the scope of the present invention. Any modifications, equivalent replacements, improvements and the like made within the principle of the present invention should be included within the protection scope of the present invention.

What is claimed is:

1. A massage device based on a novel linear motor, comprising:
   a motor assembly (20), wherein the motor assembly (20) comprises an axially punched and laminated magnetic guide core (21), a holding through cavity (211) is formed in a core of the magnetic guide core (21), clamping slots (212) are formed in two opposite side walls of the holding through cavity (211), axially punched and laminated winding cores (22) are mounted in the clamping slots (212), winding frames (23) are mounted on the winding cores (22), winding grooves (231) in which a plurality of layers of coils are wound are formed in the winding frames (23), a mover bracket (24) which is mounted between the two winding cores (22) and in which a strong magnet (25) is clamped is further disposed in the holding through cavity (211), and a transmission push rod (26) is disposed on an axial end of the mover bracket (24); and
   a massage assembly (30), wherein the massage assembly (30) is mounted on an end, away from the motor assembly (20), of a guide through hole (13) and is connected to a transmission end of the motor assembly (20).

2. The massage device based on the novel linear motor according to claim 1, wherein the massage device based on the novel linear motor further comprises a motor end cover (10), the motor end cover (10) comprises a first end cover (11) and a second end cover (12), the motor assembly (20) is disposed between the first end cover (11) and the second end cover (12), and the guide through hole (13) corresponding to the transmission push rod (26) is formed in the first end cover (11) and/or the second end cover (12); and
   mounting through holes (213) are formed in two sides, where the winding cores (22) are mounted, of the magnetic guide core (21), and are separately disposed in two sides of the clamping slots (212), and fixing columns (14) adapted to the mounting through holes (213) are disposed on ends, close to the magnetic guide core (21), of the first end cover (11) and the second end cover (12).

3. The massage device based on the novel linear motor according to claim 1, wherein the winding cores (22) comprise connection cores (222), clamping convex blocks (221), and inductive convex blocks (223), the clamping convex blocks (221) are connected to the inductive convex blocks (223) via the connection cores (222), are disposed on ends, away from the mover bracket (24), of the connection cores (222), and are adapted to the clamping slots (212), and the winding frames (23) are disposed between the clamping convex blocks (221) and the inductive convex blocks (223) and are mounted on the connection cores (222).

4. The massage device based on the novel linear motor according to claim 3, wherein radial dimensions of the clamping convex blocks (221) are equal to radial dimensions of the connection cores (222), the winding frames (23) are annular and are adapted to the connection cores (222) in inner diameters, and the winding frames (23) are mounted on the connection cores (222) after passing through the clamping convex blocks (221).

5. The massage device based on the novel linear motor according to claim 3, wherein grooves (224) are formed in two opposite sides of the connection cores (222), the winding frames (23) are "U"-shaped, clamping hooks (232) are disposed in openings of the winding frames (23), and the winding frames (23) are embedded in the grooves (224) and are fixedly connected to the connection cores (222) via the clamping hooks (232).

6. The massage device based on the novel linear motor according to claim 1, wherein the winding frames (23) comprise two symmetrically-disposed "U"-shaped frame bodies (234) separately disposed on two axial sides of the winding cores (22), opening sides of the two "U"-shaped frame bodies (234) are oppositely disposed and are embedded in the winding cores (22), and the opening sides of the two "U"-shaped frame bodies (234) are connected in a clamping way.

7. The massage device based on the novel linear motor according to claim 1, wherein the massage device based on the novel linear motor further comprises a transmission mechanism (60, 70, 80, 90), the motor assembly (20) is connected to the massage assembly (30) by the transmission mechanism (60, 70, 80, 90), and the transmission mechanism (60, 70, 80, 90) is used to convert linear reciprocating motion of the transmission push rod (26) into a flapping and/or tapping action of the massage assembly (30).

8. The massage device based on the novel linear motor according to claim 1, wherein a holding cavity (241) is formed in the mover bracket (24), a plurality of limit blocks (242) are disposed on one end of the holding cavity (241), elastic clamping blocks (243) are disposed on the other end of the holding cavity (241), the strong magnet (25) is mounted in the holding cavity (241) and is connected to the mover bracket (24) in a clamping way via the elastic clamping blocks (243), the strong magnet (25) is equally divided, in an axial direction, into two areas with opposite magnetic poles or into two strong magnets with equal area and opposite magnetic poles, and two opposite radial magnetic forces exist in the two areas in the axial direction of the strong magnet (25).

9. The massage device based on the novel linear motor according to claim 1, wherein the massage assembly (30) is connected to an end, away from the mover bracket (24), of the transmission push rod (26), the massage assembly (30) comprises, but is not limited to, a piston-type suction assembly, a vortex-type suction assembly, an impeller-type suction assembly, a cyclone-type suction assembly, a cam-type suction assembly, an eccentric-wheel-type suction assembly, and a screw-type suction assembly, the piston-type suction assembly comprises a piston member (31) and a suction member (32), the piston member (31) is disposed in the guide through hole (13) and is fixedly connected to the transmission push rod (26), the suction member (32) is disposed on an end, away from the motor assembly (20), of the guide through hole (13), and a fixing groove (311) on which a sealing rubber ring (312) is mounted is further formed in a peripheral side, in contact connection with the guide through hole (13), of the piston member (31).

10. The massage device based on the novel linear motor according to claim 1, wherein avoidance bevels (233) are disposed on ends, close to the mover bracket (24), of the winding frames (23).

* * * * *